(12) United States Patent
Sandstrom

(10) Patent No.: US 8,242,194 B2
(45) Date of Patent: Aug. 14, 2012

(54) PREPARATION OF HIGH SILICA RUBBER COMPOSITION, RESULTING RUBBER COMPOSITION AND TIRE HAVING COMPONENT THEREOF

(75) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 241 days.

(21) Appl. No.: 12/573,170

(22) Filed: Oct. 5, 2009

(65) Prior Publication Data

US 2011/0082242 A1     Apr. 7, 2011

(51) Int. Cl.
*B32B 27/28* (2006.01)
*C08K 5/09* (2006.01)
*C08K 5/10* (2006.01)
*C08K 3/34* (2006.01)
*C08K 3/04* (2006.01)
*B60C 1/00* (2006.01)

(52) U.S. Cl. .................. 524/300; 524/492; 524/495

(58) Field of Classification Search .............. 524/300, 524/493, 492, 495
See application file for complete search history.

(56) References Cited

U.S. PATENT DOCUMENTS

| 7,473,724 B2 | 1/2009 | Hsu et al. ............... 524/114 |
| 2007/0037917 A1* | 2/2007 | Sandstrom ............ 524/493 |
| 2008/0027162 A1 | 1/2008 | Hus et al. ............... 524/262 |
| 2008/0194748 A1* | 8/2008 | Futamura ............... 524/394 |

FOREIGN PATENT DOCUMENTS

EP     1958983     8/2008

OTHER PUBLICATIONS

European Search Report completed Mar. 29, 2011.

* cited by examiner

*Primary Examiner* — Mark Eashoo
*Assistant Examiner* — Angela C Scott
(74) *Attorney, Agent, or Firm* — Henry C. Young, Jr.

(57) ABSTRACT

The invention relates to preparation of a high silica reinforcement-containing rubber composition by a method which involves a delayed and divided inclusion of greater than 50 percent of fatty acid salt processing aid to a rubber composition in an internal rubber mixer following completion of addition of precipitated silica and silica coupling agent in a preceding rubber mixing step in an internal rubber mixer. The invention further relates to a resulting rubber composition and to tires having a component thereof such as, for example, a tire tread.

7 Claims, No Drawings

PREPARATION OF HIGH SILICA RUBBER COMPOSITION, RESULTING RUBBER COMPOSITION AND TIRE HAVING COMPONENT THEREOF

FIELD OF THE INVENTION

The invention relates to preparation of a high silica reinforcement-containing rubber composition by a method which involves a delayed and divided inclusion of greater than 50 percent of fatty acid salt processing aid to a rubber composition in an internal rubber mixer following completion of addition of precipitated silica and silica coupling agent in a preceding rubber mixing step in an internal rubber mixer. The invention further relates to a resulting rubber composition and to tires having a component thereof such as, for example, a tire tread.

BACKGROUND OF THE INVENTION

Various rubber compositions for components for various products, such as for example tires, contain particulate reinforcement comprised of a combination of precipitated silica with a silica coupling agent for the silica as well as rubber reinforcing carbon black. Coupling agents are used for coupling the precipitated silica to diene-based elastomers contained in the rubber composition.

Representative of such coupling agents are, for example, bis(3-trialkoxysilylalkyl) polysulfides which contain an average of from about 2 to about 4 connecting sulfur atoms in their polysulfidic bridge, such as for example those comprised of bis(3-triethoxysilylpropyl) polysulfide, and alkoxyorganomercaptosilanes.

However, use of such polysulfide based coupling agent, particularly such coupling agent which contains an average of from about 3 to about 4 connecting sulfur atoms in its polysulfidic bridge, can tend to liberate free, or otherwise make available, sulfur and to thereby promote a degree of premature crosslinking of the rubber with an attendant increase in its viscosity during elevated temperature mixing of the uncured rubber. Such phenomenon is well known to those having skill in such art.

It is desired herein to utilize a bis(3-trialkoxysilylalkyl) polysulfide, or alkoxyorganomercaptosilane, as a coupling agent for precipitated silica in a diene-based elastomer composition in a manner which provides a lower rubber viscosity for the resultant rubber composition product obtained from the internal rubber mixer.

In practice, the diene-based elastomer compositions typically contain a processing aid in a form of a fatty acid salt. Such fatty acid salt may be, for example, a fatty acid salt formed in situ within the rubber composition as a reaction product of zinc oxide and at least one long chain fatty carboxylic acid such as, for example, stearic acid, palmitic acid and oleic acid and particularly fatty acid comprised of a mixture of stearic acid, palmitic acid and oleic acid.

Alternatively, it is envisioned that the fatty acid salt may be introduced into the rubber composition as a pre-formed fatty acid salt as a composite of a fatty acid anion and cation such as, for example, zinc, calcium, magnesium and aluminum. For example, such fatty acid salt may be a calcium fatty acid salt or zinc fatty acid salt.

Historically, one method of providing a lower viscosity rubber composition from an internal rubber mixer is to simply significantly increase the aforesaid fatty acid salt processing aid content of the rubber composition.

However, the inclusion of a significantly increased fatty acid salt content in the rubber composition is envisioned herein as tending to dilute, or otherwise degrade, various physical properties of the rubber composition, particularly various physical properties of the eventually sulfur cured rubber composition.

While the mechanism might not be fully understood, it is envisioned herein that the fatty acid salt tends to be absorbed onto the porous precipitated silica surface to thereby inhibit some of the coupling agent promoted coupling taking place between the silica and diene-based elastomer.

For this invention it has been observed, and is considered herein a discovery that, by delayed and divided inclusion of a fatty acid salt, whether as a pre-formed fatty acid salt addition or as a fatty acid salt formed in situ within the rubber composition, which contains precipitated silica reinforcement and coupling agent, during the mixing process, the final viscosity (Mooney viscosity) of the mixed rubber composition can be reduced to create a rubber composition with various of its physical properties improved.

For this invention, it has been found and observed that the delayed fatty acid salt inclusion may be different from an initial and divided inclusion of a fatty acid salt in the preparation of the rubber composition, which is a particular benefit for the practice of this invention in producing a beneficial rubber composition.

In practice vulcanized elastomer products are typically prepared by thermomechanically mixing unvulcanized rubber and various compounding ingredients in a step-wise manner to form a compounded rubber followed by shaping and curing the compounded rubber at an elevated temperature to form a vulcanized product.

Initially, the elastomer (rubber) and various compounding ingredients, typically exclusive of sulfur and sulfur vulcanization accelerators, are typically blended in one or more what are generally referred to as being non-productive thermomechanical mixing stages, or steps, in a suitable internal rubber mixer, in the absence of sulfur and sulfur cure accelerators. Such non-productive mixing is usually conducted at high shear mixing conditions at an elevated temperature in a range, for example, of about 140° C. to 190° C. and often in a range of about 150° C. to 180° C.

Following such non-productive mixing of the rubber composition, sulfur and sulfur vulcanization accelerators (curatives), are mixed with the rubber composition in a final mixing stage, which is often referred to as being a productive mixing stage, or step, also in an internal rubber mixer, to a significantly lower mixing temperature in a range of about 100° C. to about 120° C. to prevent premature curing of the rubber composition.

The rubber composition is typically allowed to cool between the aforesaid various mixing steps, for example, to a temperature below 50° C.

Such non-productive mixing steps and final productive mixing step are well known to those having skill in the rubber mixing art.

For this invention, it is proposed to evaluate a blending of the precipitated silica and diene-based elastomer(s) in at least one preliminary, non-productive mixing step in an internal rubber mixer in the presence of less than 50 percent of fatty acid salt processing aid to minimize initial contact of the precipitated silica with the fatty acid salt processing aid and to thereafter blend the remainder of greater than 50 percent of the fatty acid salt processing aid such processing aid(s) with the silica-containing rubber composition to achieve an enhanced silica-reinforced rubber composition after an initial reaction between the silica and coupling agent.

In such manner, not only would inclusion of a major portion of the fatty acid salt be delayed but the overall inclusion of the fatty acid salt would be divided with only a minor portion of the fatty acid salt being provided together with the silica and silica coupling agent which is believed to be a significant departure from past practice.

Such evaluation is to therefore evaluate what effect would occur if a partial, divided, delayed addition (delayed addition) of greater than 50 percent of the fatty acid salt processing aid would be made after addition of, and therefore after an initial reaction of, the silica and silica coupling agent, to the rubber composition and the resultant silica-containing rubber composition.

Such evaluation is to further evaluate an inclusion of an initial fatty acid salt to the rubber composition coincident with or prior to addition of the precipitated silica and silica with a delayed different fatty acid inclusion to the rubber composition subsequent to the addition of, and in a separate mixing step from, said initial fatty acid salt to the rubber composition in which the later, delayed inclusion of the different fatty acid salt constitutes the major (at greater than 50 percent) portion of the overall fatty acid salt addition to the rubber composition.

The term "phr" as used herein, and according to conventional practice, refers to "parts of a material per 100 parts by weight of rubber, or elastomer".

In the description of this invention, the terms "rubber" and "elastomer" if used herein, may be used interchangeably, unless otherwise prescribed. The terms such as "rubber composition", "compounded rubber" and "rubber compound", if used herein, are used interchangeably to refer to rubber which has been blended or mixed with various ingredients and materials and "rubber compounding" or "compounding" may be used to refer to the mixing of such materials. Such terms are well known to those having skill in the rubber mixing or rubber compounding art.

SUMMARY AND PRACTICE OF THE INVENTION

In accordance with this invention, a method of preparing a silica reinforcement containing rubber composition with a delayed addition of fatty acid salt processing aid comprises the sequential steps of, based upon parts by weight per 100 parts by weight rubber (phr):

(A) mixing (e.g. thermomechanically mixing), in an internal rubber mixer, and with at least one non-productive mixing step (e.g. mixing conducted to a mixing temperature in a range of about 140° C. to about 190° C., alternatively in a range of about 150° C. to about 180° C.):

(1) 100 parts by weight of at least one sulfur vulcanizable elastomer selected from conjugated diene homopolymers and copolymers and copolymers of vinyl aromatic compound (e.g. styrene) with at least one conjugated diene;

(2) about 15 to about 120, alternatively about 30 to about 110, phr of particulate reinforcing filler comprised of precipitated silica and rubber reinforcing carbon black, wherein said reinforcing filler contains from 55 to about 100, alternately from 75 to about 90, weight percent precipitated silica;

(3) at least one coupling agent comprised of:

(a) a bis(3-trialkoxysilylalkyl)polysulfide having an average of from 2 to about 4, alternately an average of from 2 to about 2.6, and further alternately an average of form 3 to about 3.8, connecting sulfur atoms in its polysulfidic bridge, or (b) alkoxyorganomercaptosilane, and (4) at least one initial fatty acid salt processing aid; and (B) providing a divided, delayed inclusion therein of at least one of the same or different fatty acid salt processing aid as said initial fatty acid processing aid subsequent to said blending said silica reinforcement and said silica coupling agent with said rubber composition where said delayed inclusion of said fatty acid salt processing aid is provided in a subsequent mixing step in a separate internal rubber mixer from said blending of said silica reinforcement and silica coupling agent (therefore providing of said delayed inclusion of fatty acid salt processing aid in the absence of said silica and silica coupling agent), (where an embodiment of the invention is thereby provided in which said silica and coupling agent are allowed to preliminarily react with each other prior to and in the absence of said delayed inclusion of said fatty acid salt processing aid);

wherein said fatty acid salt processing aid is provided as at least one of:

(1) a fatty acid salt as an in situ reaction of zinc oxide and fatty acid comprised of at least one of stearic acid, palmitic acid and oleic acid, and their mixtures, and (2) pre-formed fatty acid salt comprised of a fatty acid anion and cation selected from zinc, calcium, magnesium or aluminum (preferably selected from a zinc or calcium cation), wherein from about 20 to about 45 percent of the total of said fatty acid salt processing aid is provided as said initial fatty acid salt processing aid and from about 55 to about 80 percent of said total fatty acid salt processing aid is provided as said delayed fatty acid salt processing aid; and (C) thereafter blending with the resultant rubber composition in a final productive mixing step in an internal rubber mixer (e.g. mixing conducted to a mixing temperature in a range of about 100° C. to about 120° C.), elemental sulfur and at least one sulfur vulcanization accelerator.

Accordingly, in one embodiment of the invention, including the method of this invention, said initial fatty acid salt may be:

(A) comprised of an in situ formed fatty acid salt by a reaction of zinc oxide with fatty acid comprised of a mixture of stearic acid, palmitic acid and oleic acid within said rubber composition, or (B) comprised of at least one pre-formed fatty acid salt by reaction of a fatty acid with a cation comprised of zinc, calcium, magnesium or aluminum, preferably zinc or calcium, and wherein said delayed fatty acid salt may be:

(C) comprised of an in situ formed fatty acid salt by a reaction of zinc oxide with fatty acid comprised of a mixture of stearic acid, palmitic acid and oleic acid within said rubber composition, or (D) comprised of at least one pre-formed fatty acid salt by reaction of a fatty acid with a cation comprised of zinc, calcium, magnesium or aluminum, preferably zinc or calcium.

It is appreciated that said method may comprise, and usually does comprise and therefore includes, an additional and subsequent step of sulfur vulcanizing the rubber composition to provide a sulfur cured rubber composition.

In further accordance with this invention, a method of preparing a tire is provided which is comprised of providing an assembly comprised of sulfur curable tire rubber components wherein at least one of said components (e.g. tire tread) is a specialized rubber component comprised of a rubber composition prepared according to the method of this invention and sulfur vulcanizing the assembly. In such case, the sulfur vulcanization of said rubber composition prepared by the method of this invention is sulfur vulcanized by said sulfur vulcanization of said tire assembly of sulfur vulcanizable tire rubber components.

In additional accordance with this invention a tire prepared by said method is provided.

A significant aspect of this invention is a delayed, and divided, inclusion of fatty acid salt processing aid in an internal rubber mixing stage separate from and subsequent to addition of the precipitated silica and silica coupling agent to the rubber composition.

The result is seen as promoting an improvement of interaction of between the precipitated silica and coupling agent, in absence of the delayed fatty acid processing aid, thereby to promote an improvement of interaction of the precipitated silica/silica coupling agent reaction product and diene-based rubber composition and thereby an improved rubber composition.

While the inclusion of fatty acid salt based processing aids, including in situ formed fatty acid salt processing aids within the rubber composition as a reaction product of zinc oxide and long chain carboxylic fatty acids comprised of at least one of stearic, palmitic and oleic acids are well known for silica-containing rubber, a delayed addition of the same or different fatty acid salt processing aid in a sense of causing the silica, together with its coupling agent, to be blended with the rubber composition prior to and separate from a major portion of such delayed inclusion of the fatty acid salt processing aid in a matter of controlled, divided and delayed addition thereof is considered herein to be a significant departure from past practice.

In further accordance with this invention, a rubber composition is provided having been prepared by such method. Such rubber composition is considered novel and a departure from past practice in a sense of having, for example, an observed reduction of the resultant, completed, mixed, uncured rubber composition's uncured modulus G', as an indication of a reduction in the resultant rubber's viscosity, and improved (increased) abrasion resistance of the sulfur cured rubber composition.

In further accordance with the invention, the process comprises the additional step of vulcanizing the prepared rubber composition at a temperature in a range of about 140° C. to about 190° C. to provide a sulfur vulcanized rubber composition.

Accordingly, the invention also thereby contemplates a vulcanized rubber composition prepared by such process.

In additional accordance with the invention the process comprises the additional steps of preparing an assembly of a tire or sulfur vulcanizable rubber with a component (e.g. a tread) comprised of the said rubber composition prepared according to the process of this invention and vulcanizing the assembly at a temperature in a range of about 140° C. to about 190° C.

Accordingly, the invention also thereby contemplates a vulcanized tire prepared by such process.

In the practice of this invention, as hereinbefore pointed out, the rubber composition is comprised of at least one diene-based elastomer, or rubber. Suitable conjugated dienes are isoprene and 1,3-butadiene and suitable vinyl aromatic compounds are styrene and alpha methyl styrene. Thus, it is considered that the elastomer is a sulfur curable elastomer. Such diene based elastomer, or rubber, may be selected, for example, from at least one of cis 1,4-polyisoprene rubber (natural and/or synthetic), and preferably natural rubber, emulsion polymerization prepared styrene/butadiene copolymer rubber, organic solution polymerization prepared styrene/butadiene rubber, 3,4-polyisoprene rubber, isoprene/butadiene rubber, styrene/isoprene/butadiene terpolymer rubbers, c is 1,4-polybutadiene, medium vinyl polybutadiene rubber (35 to 50 percent vinyl), high vinyl polybutadiene rubber (50 to 90 percent vinyl), styrene/isoprene copolymers, emulsion polymerization prepared styrene/butadiene/acrylonitrile terpolymer rubber and butadiene/acrylonitrile copolymer rubber.

Other and additional diene-based elastomers include specialized solution polymerization prepared high vinyl styrene/butadiene copolymer rubber (HV-S-SBR) having a bound styrene content in a range of about 5 to about 45 percent and a vinyl 1,2-content based upon its polybutadiene portion in a range of from about 30 to about 90 percent, particularly such (HV-S-SBR) having a relatively high onset high glass transition (Tg) value in a range of from about −20° C. to about −40° C. to promote a suitable wet traction for the tire tread and also a relatively high hot rebound value (100° C.) to promote a relatively low rolling resistance for the tread rubber composition intended for relatively heavy duty use. Such specialized high vinyl styrene/butadiene rubber (HV-S-SBR) might be prepared, for example, by polymerization in an organic solution of styrene and 1,3-butadiene monomers to include a chemical modification of polymer chain endings and to promote formation of vinyl 1,2-groups on the butadiene portion of the copolymer. A HV-S-SBR may be, for example, Duradene 738™ from Firestone/Bridgestone.

Other and additional elastomers are functionalized styrene/butadiene copolymer elastomers (functionalized SBR elastomers) containing amine and/or siloxy (e.g. alkoxyl silane as SiOR) functional groups.

Representative of such amine functionalized SBR elastomers is, for example, SLR4601™ from Dow Chemical and T5560™ from JSR, and in-chain amine functionalized SBR elastomers mentioned in U.S. Pat. Nos. 6,735,447 and 6,936,669.

Representative of such siloxy functionalized SBR elastomers is, for example, SLR4610™ from Dow Chemical.

Representative of such combination of amine and siloxy functionalized SBR elastomers is, for example, HPR350™ from JSR.

Other and additional elastomers are functionalized styrene/butadiene copolymer elastomers (functionalized SBR elastomers) containing hydroxy or epoxy functional groups.

Representative of such hydroxy functionalized SBR elastomers is, for example, Tufdene 3330™ from Asahi.

Representative of such epoxy functionalized SBR elastomers is, for example, Tufdene E50™ from Asahi.

In practice, it is therefore envisioned that said sulfur vulcanizable elastomer may be comprised of, for example, polymers of at least one of isoprene and 1,3-butadiene; copolymers of styrene and at least one of isoprene and 1,3-butadiene; high vinyl styrene/butadiene elastomers having a vinyl 1,2-content based upon its polybutadiene in a range of from about 30 to 90 percent and functionalized copolymers comprised of styrene and 1,3-butadiene ("functionalized SBR") selected from amine functionalized SBR, siloxy functionalized SBR, combination of amine and siloxy functionalized SBR, epoxy functionalized SBR and hydroxy functionalized SBR.

The siliceous pigments preferably employed in this invention are precipitated silicas such as, for example, those obtained by the acidification of a soluble silicate, e.g., sodium silicate, typically in the presence of an electrolyte. Such precipitated silicas are well known to those having skill in such art.

Such precipitated silicas might have, for example, a BET surface area, as measured using nitrogen gas, preferably in the range of about 40 to about 600, and more usually in a range of about 50 to about 300 square meters per gram. A BET method of measuring surface area is described in the *Journal of the American Chemical Society*, Volume 60, understood to include Page 308 in the year 1938.

The silica may also have, for example, a dibutylphthalate (DBP) absorption value in a range of about 100 to about 350, and more usually about 150 to about 300 cc/100 gm.

Various commercially available silicas may be used, for example, only for example herein, and without limitation, silicas commercially available from PPG Industries under the Hi-Sil trademark with designations Hi-Sil 210, 243, etc; silicas available from Rhone-Poulenc, with, for example, designation of Zeosil 1165 MP, silicas available from Degussa GmbH with, for example, designations VN2 and VN3, etc and silicas commercially available from Huber having, for example, a designation of Hubersil 8745.

As previously indicated, the silica coupling agent for the precipitated silica reinforcement may be comprised of, for example, a bis(3-trialkoxysilylalkyl)polysulfide containing an average of from about 2 to about 4, although it may alternately be an average of from about 2 to 2.6 or alternately from about 3.4 to about 3.8, connecting sulfur atoms in its polysulfidic bridge.

Alkyl radicals for said alkoxy groups may be comprised of at least one ethyl radical. The alkyl radical may be comprised of, for example butyl, propyl and amyl radicals, preferably a propyl radical.

Representative of such bis(3-trialkoxysilylalkyl)polysulfide coupling agent is a bis(3-trialkoxysilylalkyl)polysulfide comprised of a bis(3-triethoxysilylpropyl)polysulfide.

Alternatively, said coupling agent may be an alkoxyorganomercaptosilane.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins and plasticizers, fillers, pigments, waxes, antioxidants and antiozonants. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, may comprise, for example, from about 1 to about 10 phr, for example, about 1 to about 5 phr. Typical amounts of processing aids may comprise, for example, about 1 to about 50 phr. Such processing aids can include, for example, aromatic, napthenic, and/or paraffinic processing oils in addition to said fatty acid salts. Typical amounts of antioxidants may comprise, for example, about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants may comprise, for example, from about 1 to 5 phr. Typical amounts of waxes, if used, may comprise for example from about 1 to about 5 phr. Often microcrystalline waxes are used. Typical amounts of peptizers if used may comprise for example about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include, for example, elemental sulfur (free sulfur) or sulfur donating vulcanizing agents, for example, an amine disulfide, polymeric polysulfide or sulfur olefin adducts which are conventionally added in the final, productive, rubber composition mixing step. Preferably, in most cases, the sulfur vulcanizing agent is elemental sulfur. As known to those skilled in the art, sulfur vulcanizing agents are used, or added in the productive mixing stage, in an amount ranging, for example, from about 0.4 to about 3 phr, or even, in some circumstances, up to about 8 phr, with a range of from about 1.5 to about 2.5, sometimes from 2 to 2.5, being usually preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from, for example, about 0.5 to about 4, preferably about 0.8 to about 1.5, phr. In another embodiment, combinations of a primary and a secondary accelerator might be used with the secondary accelerator being used in smaller amounts (for example, about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are, for example, amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

It is envisioned that the silica-containing rubber composition of this invention can be used for various purposes. For example, it can be used for various tire components such as for example, treads, sidewall, ply coat and wire coat rubber compositions. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

Rubber compositions (samples) were prepared comprised of sulfur vulcanizable rubber mixtures containing silica reinforcement, silica coupling agent and fatty acid salt processing aid(s).

Methods of preparing the rubber compositions were evaluated.

Rubber Compositions A and B are Control rubber Compositions.

Rubber Compositions C, D E and F are Experimental rubber Compositions.

For Control rubber Composition A, the silica and silica coupling agent, were blended with the rubber composition in two initial non-productive mixing stages (NP1 and NP2) in an internal rubber mixer with an initial inclusion of fatty acid salt processing aid produced in situ within the rubber composition in one of said initial non-productive mixing stages (NP1) by addition of a combination of zinc oxide together with 3 parts by weight of a fatty acid mixture comprised of stearic acid, palmitic acid and oleic acid.

Control rubber Composition B was prepared in the manner of Control Rubber Composition A except that an increased amount of 7 parts of the fatty acid mixture was added in said initial non-productive mixing stage (NP1) without increasing the zinc oxide addition.

Experimental rubber Composition C was prepared in the manner of Control rubber Composition A except a divided and delayed additional amount of 4 parts of the fatty acid mixture was added to the rubber composition separate from and in a subsequent non-productive mixing stage (NP3) subsequent to the aforesaid initial addition of fatty acid mixture, zinc oxide, precipitated silica and silica coupling agent in the initial non-productive mixing stages (NP1 and NP2).

Experimental rubber Composition D was prepared in the manner of Control rubber Composition A except a delayed additional amount of 4 parts of a low molecular weight polyethylene glycol was added to the rubber composition separate from and in a subsequent non-productive mixing stage (NP3) subsequent to the aforesaid initial addition of fatty acid mixture, zinc oxide, precipitated silica and silica coupling agent in the initial non-productive mixing stages (NP1 and NP2).

Experimental rubber Composition E was prepared in the manner of Control rubber Composition A except a delayed addition of 4 parts of a pre-formed calcium fatty acid salt processing aid to the rubber composition in a subsequent non-productive mixing stage (NP3), to thereby provide a combination of initial in situ formed zinc fatty acid salt processing aid added in an initial non-productive mixing stage (NP1) and a divided, delayed addition, in the absence of silica and silica coupling agent addition, of said pre-formed calcium fatty acid salt processing aid in a subsequent non-productive mixing stage (NP3) from the aforesaid initial addition of fatty acid mixture, zinc oxide, precipitated silica and silica coupling agent in the initial non-productive mixing stages (NP1 and NP2).

Experimental rubber Composition F was prepared in the manner of Control rubber Composition A except a delayed addition of 4 parts of a pre-formed zinc fatty acid salt processing aid to the rubber composition in a subsequent non-productive mixing stage (NP3), to thereby provide a combination of initial in situ formed zinc fatty acid salt processing aid added in an initial non-productive mixing stage (NP1) and a delayed addition, in the absence of silica and silica coupling agent addition, of said pre-formed zinc fatty acid salt processing aid, in a subsequent non-productive mixing stage from the aforesaid initial addition of fatty acid mixture, zinc oxide, precipitated silica and silica coupling agent in the initial non-productive mixing stages (NP1 and NP2).

The basic rubber composition formulation is presented in Table 1 and the amounts and percentages of the ingredients are expressed in terms of weight, including parts by weight (phr), unless otherwise indicated.

The rubber compositions were prepared by mixing the elastomers(s) together with reinforcing fillers, coupling agents and other rubber compounding ingredients in a first non-productive mixing stage (NP1) in an internal rubber mixer for about 4 minutes to a temperature of about 160° C. The rubber mixture is then mixed in a second non-productive mixing stage (NP2) in an internal rubber mixer for about 4 minutes to a temperature of about 160° C. and then in a third non-productive mixing stage (NP3) for about 4 minutes to a temperature of about 160° C.

The resulting rubber composition is then mixed in a productive mixing stage (PR) in an internal rubber mixer with sulfur curatives for about 2 minutes to a temperature of about 110° C. The rubber composition is sheeted out and cooled to below 50° C. between each of the non-productive mixing steps and prior to the productive mixing step.

TABLE 1

|  | Parts |
| --- | --- |
| First Non-Productive Mixing Step (NP-1) | |
| S-SBR rubber[1] | 70 (96.25 with oil extender) |
| Cis 1,4-polybutadiene rubber[2] | 30 |
| Silica[3] | 65 |
| Coupling agent[4] | 7.8 |
| Carbon black[5] | 0 |
| Zinc oxide | 4 |
| Fatty acid[6] | 3 or 7 |
| Rubber processing oil, added | 5 |
| Second Non-Productive Mixing Step (NP-2) | |
| Silica[3] | 45 |
| Coupling agent[4] | 5.4 |
| Rubber processing oil, added | 3 |
| Third Non-Productive Mixing Step (NP-3) | |
| Carbon black[5] | 10 |
| Microcrystalline wax and antidegradant | 3.5 |
| Polyethylene glycol[7] | 0 and 4 |
| Calcium fatty acid soap[8] | 0 and 4 |
| Zinc fatty acid soap[9] | 0 and 4 |
| Productive Mixing Step (PR) | |
| Sulfur | 1 |
| Accelerator(s)[10] | 3.7 |

[1]Solution polymerization prepared styrene/butadiene rubber containing 30 percent styrene content and having a Tg (glass transition temperature) of about −20° C., as Solflex 30H30A41 ™ from The Goodyear Tire & Rubber Company, oil extended and reported in the Table in terms of the rubber itself. The total of rubber and rubber processing oil is recited in parenthesis

[2]Cis 1,4-polybutadiene rubber as BUD1207 ™ from The Goodyear Tire & Rubber Company

[3]Precipitated silica as Zeosil 1165MP ™ from Rhodia

[4]Coupling agent as NXT Silane ™ a product of Momentive Performance Materials

[5]Rubber reinforcing carbon black as N120, an ASTM designation

[6]Fatty acid comprised of stearic acid, palmitic acid and oleic acid

[7]Polyethylene glycol having a relatively low molecular weight of about 6,000

[8]Calcium fatty acid soap as WB-16 ™ from Struktol

[9]Zinc fatty acid soap as EF44 ™ from Struktol

[10]Sulfenamide and guanidine based sulfur cure accelerators

The following Table 2 illustrates cure behavior and various physical properties of rubber Control rubber Sample A and Experimental rubber Samples B and C. Where a cured rubber sample was evaluated, such as for the stress-strain, rebound, hardness, tear strength and abrasion measurements, the rubber sample was cured for about 14 minutes at a temperature of about 160° C.

TABLE 2

|  | Samples | | | | | |
|---|---|---|---|---|---|---|
|  | Control | Control | Experimental | | | |
| Silica, Fatty Acid inclusion Summaries | A | B | C | D | E | F |
| First Non Productive Mix Stage (NP1) | | | | | | |
| Silica | 65 | 65 | 65 | 65 | 65 | 65 |
| Coupling agent | 7.8 | 7.8 | 7.8 | 7.8 | 7.8 | 7.8 |
| Fatty acid | 3 | 7 | 3 | 3 | 3 | 3 |
| Zinc oxide | 4 | 4 | 4 | 4 | 4 | 4 |
| Second Non Productive Mix Stage (NP2) | | | | | | |
| Silica | 45 | 45 | 45 | 45 | 45 | 45 |
| Coupling agent | 5.4 | 5.4 | 5.4 | 5.4 | 5.4 | 5.4 |
| Third Non Productive Mix Stage (NP3) | | | | | | |
| Fatty acid | 0 | 0 | 4 | 0 | 0 | 0 |
| Polyethylene glycol, low molecular weight | 0 | 0 | 0 | 4 | 0 | 0 |
| Calcium fatty acid soap | 0 | 0 | 0 | 0 | 4 | 0 |
| Zinc fatty acid soap | 0 | 0 | 0 | 0 | 0 | 4 |
| Rubber Processing Information | | | | | | |
| Uncured rubber composition RPA[1], 100° C., 1 Hz, G', uncured, kPa | 218 | 193 | 192 | 242 | 208 | 208 |
| Rheometer[2], minimum torque, dNm | 3.1 | 2.7 | 2.6 | 3.4 | 2.8 | 2.8 |
| Curing Information | | | | | | |
| T90, minutes | 21 | 19 | 19 | 23 | 18 | 20 |
| Wet Traction, Predictive, Information | | | | | | |
| Rebound, 0° C. | 12 | 13 | 12 | 13 | 13 | 13 |
| Handling, Predictive, Information | | | | | | |
| RPA[1], 100° C., 10 Hz, 10% strain, storage modulus G', kPa | 2248 | 2041 | 1883 | 2381 | 1961 | 2012 |
| 300 percent ring modulus (kPa) | 9.4 | 8.5 | 8.7 | 10.4 | 9.4 | 8.9 |
| Shore A hardness, hot, 100° C. | 66 | 62 | 62 | 65 | 61 | 62 |
| Rolling Resistance, Predictive, Information | | | | | | |
| Rebound, 100° C. | 51 | 52 | 54 | 53 | 54 | 51 |
| Tan delta, 100° C. | 0.19 | 0.18 | 0.17 | 0.17 | 0.16 | 0.18 |
| Tear strength[3], 95° C., newtons | 66 | 75 | 78 | 63 | 73 | 80 |
| Abrasion resistance, Grosch[4], high, mg/km | 422 | 442 | 413 | 393 | 400 | 396 |

[1]Data according to Rubber Process Analyzer (RPA)
[2]Data according to Moving Die Rheometer instrument, (MDR)
[3]Data obtained according to a tear strength (peal adhesion) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument at 95° C. and reported as Newtons force.
[4]The Grosch abrasion rate determination on a LAT-100 Abrader and measured in terms of mg/km of rubber abraded away. The test rubber sample is placed at a slip angle under constant load (Newtons) as it traverses a given distance on a rotating abrasive disk (disk from HB Schleifmittel GmbH). In practice, a High abrasion severity test may be run, for example, at a load of 70 N (70 Newtons) at a slip angle of 12 degrees and a disk speed of 20 kPa (kilometers per hour) at a sample travel of 250 m.

To facilitate a clearer understanding of significant and distinguishing data reported in Table 2, the following Table 3 is presented with important representative data taken from Table 2.

TABLE 3

|  | Rubber Compositions | | | | | |
|---|---|---|---|---|---|---|
|  | Control | Control | Experimental | | | |
|  | A | B | C | D | E | F |
| Fatty acid addition: Mixing stage = NP1 | | | | | | |
| In situ formed fatty acid salt, zinc cation | 3 | 7 | 3 | 3 | 3 | 3 |
| Divided fatty acid addition: Mixing stage = NP3 | | | | | | |
| In situ formed fatty acid salt, zinc cation | 0 | 0 | 4 | 0 | 0 | 0 |
| Polyethylene glycol addition | 0 | 0 | 0 | 4 | 0 | 0 |
| Pre-formed fatty acid salt, calcium cation | 0 | 0 | 0 | 0 | 4 | 0 |
| Pre-formed fatty acid salt, zinc cation | 0 | 0 | 0 | 0 | 0 | 4 |

TABLE 3-continued

|  | Rubber Compositions | | | | | |
| --- | --- | --- | --- | --- | --- | --- |
|  | Control | Control | Experimental | | | |
|  | A | B | C | D | E | F |
| Uncured Rubber Processing | | | | | | |
| G', 100° C., 1 Hz (kPa) | 218 | 193 | 192 | 242 | 208 | 208 |
| Rebound, 100° C. | 51 | 52 | 54 | 53 | 54 | 51 |
| Grosch abrasion, high, mg/km | 422 | 442 | 413 | 393 | 400 | 396 |

A basic first criteria for the evaluation is to determine if a divided and delayed fatty acid salt processing aid inclusion into the silica and silica coupling agent containing rubber composition can provide a rubber product with a reduced uncured modulus G' physical property.

A second criteria, if the first rubber processing related criteria can be obtained, is to determine if an improved Grosch abrasion physical property for the rubber composition can be obtained.

Another desirable feature, if the first rubber processing related criteria can be obtained, would be to provide an improvement in the rubber composition's hot (100° C.) rebound value which is understood to be predictive of reduced rolling resistance for a tire tread of such rubber composition which would lead to better fuel economy for an associated tire.

From Table 3, it can be seen that for all of the rubber compositions A through F the precipitated silica and silica coupling agent were mixed with the rubber composition in an internal rubber mixer in non-productive mixing stages NP1 and NP2.

For all of the rubber compositions A through F, an in situ formed zinc fatty acid salt processing aid was provided commensurate with or prior to said addition of said precipitated silica and silica coupling agent addition. For Control rubber composition B, an increased amount of in situ formed zinc fatty acid salt was added.

It is observed that for Control rubber Composition B, where the non-delayed initial fatty acid introduction in non-productive mixing stage NP1 was increased from the 4 phr level used in Control rubber Composition A to a value of 7 phr, the rubber processing for the resultant rubber composition was improved as indicated by the reduction in the uncured modulus G' of the uncured rubber from 218 to 193 kPa. Therefore it is considered that Control rubber Composition B passed the initial rubber processing based criteria. However it is also observed that the abrasion resistance of the cured rubber composition B was adversely affected as seen by the significant increase in the Grosch abrasion value to 442 from 422 mg/km (an increase in the abrasion value is an indication of worse abrasion resistance). Therefore, it is considered that cured rubber composition B did not pass the aforesaid second, abrasion resistance based, criteria. There was little change in the hot (100° C.) rebound value.

It is observed that for Experimental rubber Composition C with the delayed inclusion of a major portion (57 percent) of the in situ formed zinc fatty acid salt processing aid, the rubber processing factor for the uncured rubber composition was improved, compared to Control rubber Composition A, as indicated by the reduction in the uncured modulus G' of the uncured rubber from 218 to 192 kPa. Therefore it is considered that Control rubber Composition C passed the initial rubber processing criteria. The abrasion resistance of the cured rubber composition C was improved with a reduction of the Grosch abrasion value to 392 from 422 mg/km (a reduced abrasion value is an indication of improved resistance to abrasion). Therefore, it is considered that cured rubber composition C passed both the rubber processing based first criteria as well as the second, abrasion resistance based, criteria.

There was also an improved rebound value, namely an increase to 54 from 51.

Moreover, it is therefore concluded that the benefit of the delayed addition of a major portion of in situ formed fatty acid salt, with greater than 50 percent of the fatty acid being delayed and added subsequent to and in an absence of addition of precipitated silica and silica coupling agent is a significant discovery both for obtaining the mixed processing uncured modulus G' value for the uncured rubber composition and the resultant beneficially cured rubber composition with its improved abrasion resistance. The improvement in its rebound value was also an added value.

It is observed for Experimental rubber Composition D, with the delayed addition of the low molecular weight polyethylene glycol processing aid (57 percent of the combined in situ formed zinc fatty acid salt and polyethylene glycol processing aids), compared to Control rubber Composition A, the rubber processing factor for the uncured final rubber composition was not improved as indicated by the significantly increased uncured modulus G' property to 242 from 218 kPa. Therefore it is considered that rubber Composition D did not pass the initial rubber processing criteria. Accordingly, while it is observed Experimental rubber Composition D passed the second, abrasion resistance based, criteria in a sense that the abrasion resistance value of the cured rubber composition D was improved, as shown by a reduction of its Grosch abrasion to a value of 393 from 422 mg/km (a reduced abrasion value is an indication of improved abrasion resistance), it is considered that the delayed addition of polyethylene glycol processing aid yielded a cured rubber composition D which was unsatisfactory since it did not pass the aforesaid first rubber processing criteria.

There was also a slight improvement in the rebound value to 53 from 51.

It is observed that the Experimental rubber Composition E with the delayed inclusion of a major portion (57 percent) of the overall fatty acid salt processing aid in a form of different rubber processing aid as a pre-formed calcium fatty acid salt, the rubber processing factor for the mixed uncured rubber composition was improved, compared to Control rubber Composition A, as indicated by a significant reduction in the uncured modulus G' of the mixed uncured rubber to a value of 208 from 218 kPa. Therefore it is considered that Experimental rubber Composition E passed the initial rubber processing criteria. It is also observed that the abrasion resistance of the cured rubber composition E was improved to a Grosch abrasion value of 400 from 422 mg/km (a reduced abrasion value is an indication of improved abrasion resistance). Therefore, it is considered that cured rubber composition E passed both the rubber processing based first criteria as well as the abrasion resistance based second criteria. Furthermore, the rebound value beneficially increased to 54 from 51.

Moreover, it is therefore concluded that the benefit of the delayed addition of a major portion of the fatty acid salt processing aid in a form of the pre-formed calcium fatty acid salt added subsequent to and in an absence of addition of precipitated silica and silica coupling agent is a significant discovery both for obtaining the uncured modulus G' value for the uncured rubber composition and the resultant beneficially cured rubber composition with the improved abrasion resistance.

It is observed that for Experimental rubber Composition F with the delayed inclusion of a major portion (57 percent) of the overall fatty acid salt processing aid in a form of different rubber processing aid as a pre-formed zinc fatty acid, the rubber processing factor for the mixed uncured rubber composition was improved, compared to Control rubber Composition A, as indicated by a significant reduction in the uncured modulus G' of the uncured rubber to 208 from 218 kPa. Therefore it is considered that Experimental rubber Composition F passed the first rubber processing based first criteria. It is also observed that the abrasion resistance of the cured rubber composition F was also significantly improved to a lower Grosch abrasion value of 393 from 422 mg/km (a reduced abrasion value is an indication of improved abrasion resistance). Therefore, it is considered that cured rubber composition F passed both the rubber processing based first criteria as well as the second abrasion resistance based second criteria. There was no beneficial improvement in the rebound value Moreover, it is therefore concluded that the benefit of the delayed addition of a major portion of the fatty acid salt processing aid in a form of the pre-formed zinc fatty acid salt added subsequent to and in an absence of addition of precipitated silica and silica coupling agent is a significant discovery both for obtaining the mixed processing uncured modulus G' value reduction for the uncured rubber composition and the resultant beneficially cured rubber composition with the improved abrasion resistance.

While certain representative embodiments and details have been shown for the purpose of illustrating the invention, it will be apparent to those skilled in this art that various changes and modifications may be made therein without departing from the spirit or scope of the invention.

What is claimed is:

1. A method of preparing a silica reinforcement containing rubber composition with a delayed addition of fatty acid salt processing aid which comprises the sequential steps of, based upon parts by weight per 100 parts by weight rubber (phr):

(A) preparing a rubber mixture by mixing, in an internal rubber mixer at a temperature in a range of from about 140° C. to about 190° C.:
  (1) 100 parts by weight of at least one sulfur vulcanizable elastomer selected from conjugated diene homopolymers and copolymers of at least one of isoprene and 1,3-butadiene and copolymers of styrene and at least one of isoprene and 1,3-butadiene;
  (2) about 15 to about 120 phr of particulate reinforcing filler comprised of precipitated silica and rubber reinforcing carbon black, wherein said reinforcing filler contains from 75 to about 90 weight percent of said precipitated silica;
  (3) a coupling agent comprised of
    a bis(3-trialkoxysilylalkyl)polysulfide having an average of from 2 to about 4 connecting sulfur atoms in its polysulfidic bridge exclusive of
    an alkoxyorganomercaptosilane, and
  (4) fatty acid salt processing aid as an in situ formed product of zinc oxide and fatty acid within the rubber composition in an amount of about 55 to about 80 percent of fatty acid; and thereafter:
(B) mixing about 45 to about 20 percent of said fatty acid with said rubber mixture in a subsequent mixing step in a separate internal rubber mixer, thereby forming a resultant rubber composition;
  wherein said fatty acid is comprised of stearic acid and at least one of palmitic acid and oleic acid; and
(C) thereafter blending, at a temperature in a range of from about 100° C. to about 120° C., elemental sulfur and at least one sulfur vulcanization accelerator with the resultant rubber composition in an internal rubber mixer.

2. The method of claim 1 wherein said method comprises an additional step of sulfur vulcanizing said rubber composition.

3. The method of claim 1 wherein said coupling agent is comprised of a bis(3-triethoxysilylpropyl)polysulfide having an average of from 3 to about 3.8 connecting sulfur atoms in its polysulfidic bridge.

4. The method of claim 1 wherein said coupling agent is comprised of a bis(3-triethoxysilylpropyl)polysulfide having an average of from 2 to 2.6 connecting sulfur atoms in its polysulfidic bridge.

5. A rubber composition prepared by the method of claim 1.

6. A method of preparing a tire comprised of providing an assembly comprised of sulfur vulcanizable tire rubber components wherein at least one of said components is a specialized rubber component comprised of a rubber composition prepared according to the method of claim 1, and sulfur vulcanizing the assembly.

7. A tire prepared by the method of claim 6.

* * * * *